Sept. 4, 1962     T. E. LOHR     3,052,497

WINDOW REGULATOR

Filed Dec. 19, 1960

INVENTOR.
Thomas E. Lohr
BY
Herbert Furman
ATTORNEY

3,052,497
WINDOW REGULATOR

Thomas E. Lohr, Detroit, Mich., assignor to General Motors Corporation, Detroit, Mich., a corporation of Delaware
Filed Dec. 19, 1960, Ser. No. 76,977
5 Claims. (Cl. 296—44)

This invention relates to window regulators and more particularly to a window regulator brake means for frictionally holding a swingable vehicle window in a plurality of open positions.

The brake means of this invention is particularly adapted for use with swingable vehicle windows and includes a pair of brake members interconnected with each other and separated by a friction washer rotatable with the window pivot shaft. A bowed leaf spring member secured against rotation engages one of the brake members to apply a resilient force axially of the window pivot shaft, and adjustable limiting means engageable with the other brake member sets the limit of resilient force between the brake members and the friction member. The one brake member further includes means cooperating with the spring member to hold both brake members against rotation relative to the shaft. Stop means are provided to limit rotational movement of the window to a limited number of degrees. The brake of this invention is of relatively simple construction and easily installed on a vehicle body and yet is adequate to hold the window in any open position thereof against wind resistance or otherwise.

The primary object of this invention is to provide a new and improved window regulator brake means for frictionally holding a swingable vehicle window in a plurality of open positions. A more specific object of this invention is to provide an improved window regulator brake means for frictionally holding a swingable vehicle window in a plurality of open positions and including a pair of brake members spaced by a friction member secure to a window pivot shaft, with cooperating means on the brake members securing the two together and with one of the cooperating means further cooperating with a spring member to hold the brake members against rotation relative to the spring member which supplies a resilient force frictionally holding the brake members in engagement with the friction member against adjustable limiting means.

These and other objects of the invention will be readily apparent from the following specification and drawings wherein.

Figure 1:
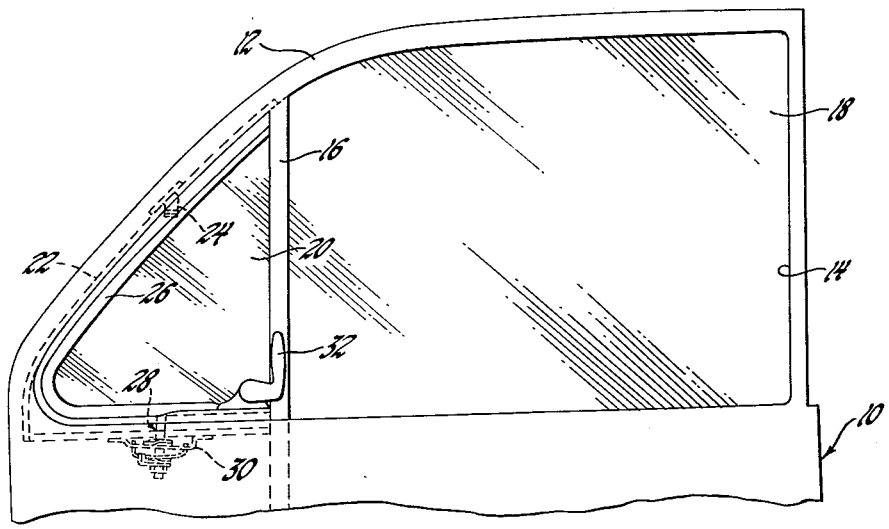
FIGURE 1 is a partial side elevational view of a vehicle body door having a swingable ventilation window mounted thereon by a window regulator embodying brake means according to this invention.

Referring now particularly to FIGURE 1 of the drawings, a vehicle body door 10 includes an upper door window frame 12 which cooperates with the lower portion of the door in defining a window opening 14. The window opening 14 is divided into forward and rearward portions by an intermediate division post channel 16. The rearward portion of the opening 14 is opened and closed by a vertically movable door window 18 which is mounted on the door 10 by a suitable window regulator mechanism, for movement between a closed position, as shown, and an open position with a well in the lower portion of the door.

The forward portion of the opening 14 is opened and closed by a swingable ventilation window 20 mounted within a window frame 22. A pair of pivotally interconnected brackets 24 on the frame 22 and on the edge framing 26 of window 20 define the upper vertically extending pivot of the window 20. The lower vertically extending pivot of the window 20, which is aligned with the upper pivot, is provided by a window pivot shaft 28 secured to framing 26 and rotatably received within aligned openings in the frame 22 and in a generally U-shaped bracket 30, the flanged legs of which are secured to the frame 22. The window 20 is locked in closed position by a suitable manual latch 32 and is swingable from this closed position to a plurality of open positions about its vertical axis of swinging upon release of the latch 32.

Figure 2:
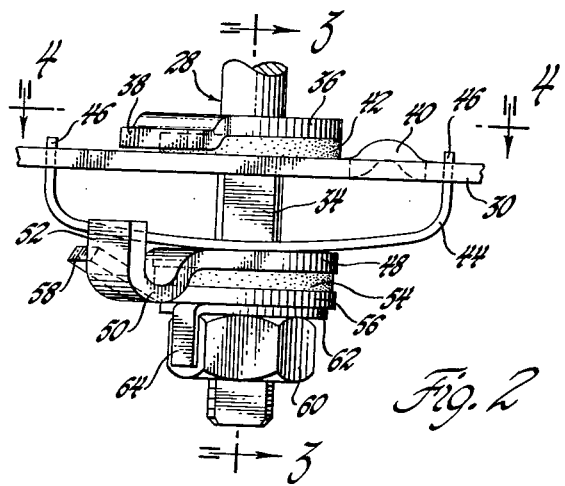
FIGURE 2 is an enlarged view of a portion of FIGURE 1.

The brake means of this invention acts to hold the window in any one of its open positions against wind resistance or otherwise and further includes means for positively locating the window in its fully open position. This will now be described with particular reference to FIGURES 2 thru 4 of the drawings.

The lower end of the shaft 28 includes diametrically opposite flattened sides so as to provide a portion 34 thereof of generally double D shape. A stop member 36 includes a central aperture of the shape of portion 34 so as to be non-rotatably coupled thereto, with the member 36 engaging the shoulders between the portion 34 and the remainder of the shaft 28. Member 36 includes an offset foot 38 which engages the outer edge of an upwardly offset bump 40 in bracket 30 when the window has reached its fully open position to positively locate the window in this position. A nylon washer 42 having a central aperture of the shape of portion 34 of shaft 28 so as to be coupled thereto fits between the member 36 and the base of the bracket 30 to prevent sliding engagement of the foot 38 with the bracket.

Figure 3:
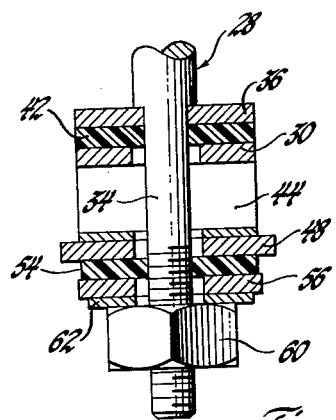
FIGURE 3 is a sectional view taken generally along the plane indicated by line 3—3 of FIGURE 2.
Figure 4:
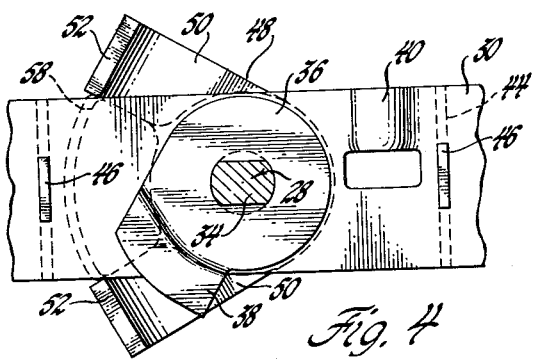
FIGURE 4 is a view taken along the plane indicated by line 4—4 of FIGURE 2.

A bowed leaf spring member 44 includes a tab 46 at each end thereof received within a complementary shaped opening in the bracket 30 to hold the member 44 against rotation relative to the shaft. As can be seen in FIGURE 3, the member 44 freely receives the portion 34 of the shaft therethrough. A first brake member 48 fits against member 44 and is freely received on the portion 34 of shaft 28. Member 48 includes a pair of angularly spaced extensions 50 having upwardly extending lateral ends 52 which straddle and engage the side edges of the spring member 44 in order to hold the brake member 48 against rotation relative to the spring member 44. A friction washer 54 having a central aperture of the shape of the portion 34 of shaft 28 so as to be rotatably coupled thereto engages the lower surface of the member 48. Member 54 may be made of any suitable friction material. A second brake member 56 is freely rotatably received on the portion 34 of shaft 28 in engagement with the friction washer 54 and includes an offset foot or extension 58 received between the lateral ends 52 of member 48, opposite the member 44, in order to couple the brake member 56 to the brake member 48 and hold the brake member 56 against rotation by the washer 54. A nut 60 is threadedly received on the portion 34 and a washer 62 between the nut and the brake member 56 includes a lateral tab 64 so as to prevent the nut from being threaded off the portion 34 during movement of the window.

When the window moves between its open and closed positions, the friction washer 54 rotates with the shaft 28 relative to the brake members 48 and 56, with the action of the leaf spring 44 against the brake member 48 serving to hold the shaft 28 in any rotative position thereof and thereby hold the window 20 in any open position thereof. When the window 20 reaches its fully open position, the extension 38 of the member 36 will engage the outer edge of the embossment 40 to provide a positive stop.

From the foregoing description, it can be seen that the brake means of this invention is of relatively simple and economical construction and can be easily mounted in place since the parts sequentially fit together on the window pivot shaft 28. Further, the force of the spring 44 against the member 48 can be infinitely adjusted at will by merely bending the tab 64 slightly outwardly and adjusting the nut 60 on the portion 34 of the shaft 28.

Thus, this invention provides a new and improved brake means for swingable vehicle windows to hold the window in any open position thereof.

What is claimed is:

1. The combination comprising, a support, a swingable vehicle window mounted on said support and including a pivot shaft, a first brake member rotatably mounted on said shaft, means limiting axial movement of said member relative to said shaft, a second brake member rotatably mounted on said shaft, cooperating means interconnecting said brake members, a friction member secured to said shaft for rotation therewith and being located intermediate said first and second brake members, resilient means secured to said support and engaging said second brake member to hold said brake members in tight frictional engagement with said friction member and hold said first brake member in engagement with said limiting means, and means on one of said brake members engageable with said resilient means to hold said one brake member against rotation relative to said friction member, said interconnecting means holding said other brake member against rotation relative to said friction member.

2. The combination comprising, a support, a swingable vehicle window mounted on said support and including a pivot shaft, a bowed spring member having its ends secured to said support and rotatably receiving said pivot shaft therethrough, a first brake member rotatably mounted on said shaft, means on said brake member engaging said spring member to hold said brake member against rotation relative thereto, a second brake member rotatably mounted on said shaft, cooperating means interconnecting said brake members, a friction member secured to said shaft for rotation therewith and being located intermediate said first and second brake members, and adjustable limiting means mounted on said shaft and engaging said second brake member to hold said brake members in tight frictional engagement with said friction member against the action of said spring member.

3. The combination comprising, a support, a swingable vehicle window mounted on said support and including a pivot shaft, a bowed spring member having its ends secured to said support and rotatably receiving said pivot shaft therethrough, a first brake member rotatably mounted on said shaft, means on said brake member straddling said spring member to hold said brake member against rotation relative thereto, a second brake member rotatably mounted on said shaft, means on said second brake member engageable with said straddling means to interconnect said brake members, a friction member secured to said shaft for rotation therewith and being located intermediate said first and second brake members, and adjustable limiting means mounted on said shaft and engaging said second brake member to hold said brake members in tight frictional engagement with said friction member against the action of said spring member.

4. The combination comprising, a support, a swingable vehicle window mounted on said support and including a pivot shaft, a leaf spring member having its ends secured to said support and rotatably receiving said pivot shaft therethrough, a first brake member rotatably mounted on said shaft and including straddling means engaging the edges of said spring member to hold said brake member against rotation relative thereto, a second brake member rotatably mounted on said shaft, means on said second brake member located between said straddling means to interconnect said brake members, a friction member secured to said shaft for rotation therewith and being located intermediate said first and second brake members, and adjustable limiting means mounted on said shaft and engaging said second brake member to hold said brake members in tight frictional engagement with said friction member against the action of said spring member.

5. The combination comprising, a support, a swingable vehicle window mounted on said support and including a pivot shaft, a bowed leaf spring member having its ends secured to said support and rotatably receiving said pivot shaft therethrough, a first brake member rotatably mounted on said shaft and including a pair of extensions, each engaging an edge of said spring member to hold said brake member against rotation relative thereto, a second brake member rotatably mounted on said shaft and including an extension received between said extensions of said first brake member to interconnect said brake members, a friction member secured to said shaft for rotation therewith and being located intermediate said first and second brake members, and adjustable limiting means mounted on said shaft and engaging said second brake member to hold said brake members in tight frictional engagement with said friction member against the resilient action of said spring member.

References Cited in the file of this patent

UNITED STATES PATENTS 2,498,429    Lane _____ Feb. 21, 1950

FOREIGN PATENTS 495,324    Canada _____ Aug. 18, 1953

OTHER REFERENCES

German application, SCH 12,616, printed Nov. 3, 1955.